United States Patent
Pryde et al.

(10) Patent No.: US 11,822,655 B1
(45) Date of Patent: Nov. 21, 2023

(54) FALSE ALARM REDUCTION BY NOVELTY DETECTION

(71) Applicant: Trend Micro Incorporated, Tokyo (JP)

(72) Inventors: Jayson Pryde, Metro Manila (PH); Bernard Bisuna, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 974 days.

(21) Appl. No.: 16/729,848

(22) Filed: Dec. 30, 2019

(51) Int. Cl.
   *G06F 21/56* (2013.01)
   *G06N 5/04* (2023.01)
   *G06N 20/00* (2019.01)

(52) U.S. Cl.
   CPC .......... *G06F 21/565* (2013.01); *G06N 5/04* (2013.01); *G06N 20/00* (2019.01); *G06F 2221/034* (2013.01)

(58) Field of Classification Search
   CPC ..................................................... G06F 21/565
   See application file for complete search history.

(56) References Cited

U.S. PATENT DOCUMENTS

| | | |
|---|---|---|
| 7,865,947 B2 | 1/2011 | Fanton et al. |
| 8,375,450 B1 | 2/2013 | Oliver et al. |
| 8,769,683 B1 | 7/2014 | Oliver |
| 8,925,087 B1 | 12/2014 | Oliver et al. |
| 9,197,665 B1 | 11/2015 | Cabot et al. |
| 9,361,458 B1 | 6/2016 | Feng et al. |
| 9,690,937 B1 | 6/2017 | Duchin et al. |
| 9,690,938 B1 | 6/2017 | Saxe et al. |
| 10,162,967 B1 | 12/2018 | Oliver et al. |
| 2013/0198119 A1* | 8/2013 | Eberhardt, III ........ G06N 20/00 706/12 |
| 2019/0260775 A1* | 8/2019 | Bartos .................... G06F 21/564 |
| 2020/0389476 A1* | 12/2020 | Sternby ................... G06N 20/00 |
| 2021/0097334 A1* | 4/2021 | Healy .................. G06K 9/6232 |
| 2021/0160266 A1* | 5/2021 | Sternby ............... H04L 63/1416 |

FOREIGN PATENT DOCUMENTS

EP     1 678 635 B1     10/2013

OTHER PUBLICATIONS

Trend Micro Security Intelligence Blog—How Machine Learning echniquest Helped US find Massive Certificate Abuse by BroweFox, Jun. 11, 2018, 8 pages, available at https://blog.trendmicro.com/trendlabs-security-intelligence/how-machine-learning-techniques-helped-us-find-massive-certificate-abuse-by-browsefox/.

(Continued)

*Primary Examiner* — Simon P Kanaan
(74) *Attorney, Agent, or Firm* — Beyer Law Group LLP

(57) ABSTRACT

Features of sample files that are known to be normal are extracted by random projection. The random projection values of the sample files are used as training data to generate one or more anomaly detection models. Features of a target file being inspected are extracted by generating a random projection value of the target file. The random projection value of the target file is input to an anomaly detection model to determine whether or not the target file has features that are novel relative to the sample files. The target file is declared to be an outlier when an anomaly detection model generates an inference that indicates that the target file has novel features.

20 Claims, 5 Drawing Sheets

(56) References Cited

OTHER PUBLICATIONS

Wikipedia—Locality-sentive hashing, 8 pages [retrieved on May 20, 2019], retrieved from the internet: https://wikipedia.org/wiki/Locality-sensitive_hashing.
Joris Kinable, et al. "Malware Classification based on Call Graph Clustering", Aug. 27, 2010, pp. 1-12, Aalto University, Dept. of Information and Computer Science, Finland.
Swathi Pai, et al. "Clustering for malware classification", published online on Jan. 27, 2016, 13 pages, J Comput virol Hack Tech.
Peng Li, et al. "On Challenges in Evaluating Malware Clustering", 2010, 18 pages.
Kyle Soska, et al. "Automatic Application Identification from Billions of Files", Aug. 13, 2017, 10 pages.
Roberto Perdisci, et al. "VAMO: Towards a Fully Automated Malware Clustering Validity Analysis", Dec. 3-7, 2012, 10 pages.
beHash: A Novel Approach to Fast Malware Clustering, Dec. 7, 2008, 8 pages.
Irfan Ui Haq, et al. "Malware Lineage in the Wild", Oct. 14, 2017, 15 pages.
Usha Narra "Clustering versus SVM for Malware Detection", May 2015, 71 pages, Master's Theses and Graduate Research, Dept. of Computer Science, San Jose State University, San Jose, California.
Mark Stamp "A Survey of Machine Learning Algorithms and Their Application in Information Security", Sep. 2018, 23 pages, San Jose State University, San Jose, California.
Jakub Lokoc, et al. "k-NN Classification of Malware in HTTPS Traffic Using the Metric Space Approach", Apr. 2016, 16 pages, SIRET research group, Dept. of Software Engineering, Charles University, Prague, Czech Republic.
Joy Nathalie Avelino, et al. "Ahead of the Curve: A Deeper Understanding of Network Threats Through Machine Learning", 2018, 17 pages, Trend Micro, A TrendLabs Research Paper.
Jonathan Oliver, et al. "TLSH—A Locality Sensitive Hash" Nov. 2013, 7 sheets, 4th Cybercrime and Trustworthy Computing Workshop, Sydney, Australia.
Outlier detection with Local Outlier Factor (LOF), 2007-2019, scikit-learn developers (BSD License), 2 sheets.
Sklearn.ensemble.IsolationForest, 2007-2019, scikit-learn developers (BSD License), 5 sheets.

\* cited by examiner

FALSE ALARM REDUCTION BY NOVELTY DETECTION

BACKGROUND OF THE INVENTION

1. Field of the Invention

The present invention relates generally to cybersecurity, and more particularly but not exclusively to file inspection.

2. Description of the Background Art

Files may be inspected for malware and other cyberthreats by pattern matching, heuristic evaluation, classification, and other file inspection algorithm. Although file inspection has improved over the years, false alarms remain a major concern. A false alarm is erroneous declaration of a normal file as malicious. The number of false alarms may be lowered by making the file inspection criteria less stringent. However, doing so will result in some malicious files not being detected.

SUMMARY

In one embodiment, features of sample files that are known to be normal are extracted by random projection. The random projection values of the sample files are used as training data to generate one or more anomaly detection models. Features of a target file being inspected are extracted by generating a random projection value of the target file. The random projection value of the target file is input to an anomaly detection model to determine whether or not the target file has features that are novel relative to the sample files. The target file is declared to be an outlier when an anomaly detection model generates an inference that indicates that the target file has novel features.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
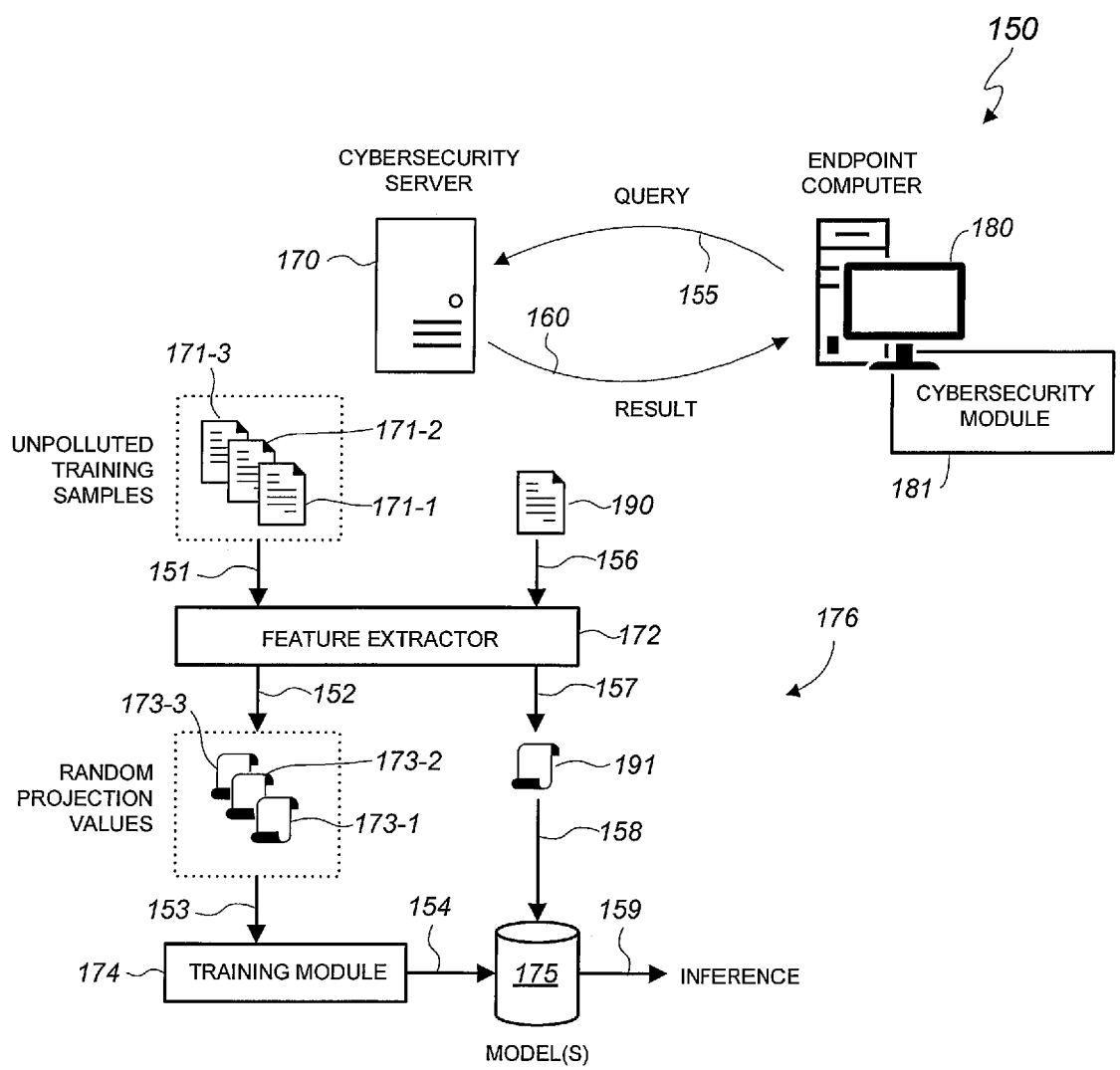
FIG. 1 shows a file inspection system in accordance with an embodiment of the present invention.

FIG. 1 shows a file inspection system 150 in accordance with an embodiment of the present invention. In the example of FIG. 1, the system 150 includes a cybersecurity server 170 and one or more endpoint computers 180. The cybersecurity server 170 and an endpoint computer 180 may communicate over a computer network, which may include the Internet.

The cybersecurity server 170 may comprise a server computer, a distributed computer system, an infrastructure of a cloud computing service, or other computing device that hosts a novelty detection module 176, which may comprise a feature extractor 172, training module 174, and one or more anomaly detection models 175. In the example of FIG. 1, the novelty detection module 176 is implemented in software, i.e., instructions that are executed by at least one processor of the cybersecurity server 170.

The feature extractor 172 may be configured to receive unpolluted training samples and extract features of each of the training samples, which in one embodiment is by random projections. In the example of FIG. 1, the unpolluted training samples consist of known (i.e., previously verified) normal files 171 (i.e., 171-1, 171-2, 171-3, . . . ). The normal files 171 may be executable files. The training samples are "unpolluted" in that the training samples only include known normal files. In the example of FIG. 1, an anomaly detection model 175 is trained on features of the normal files 171. As will be more apparent below, a target (i.e., being inspected) file will be detected to be an outlier when an anomaly detection model 175 infers that the target file has features that are novel (i.e., new) relative to features of the training samples. Novel features are also referred to herein as "anomalous" or "outlier" features.

In the example of FIG. 1, the feature extractor 172 receives the unpolluted training samples (see arrow 151) and extracts the features of each of the files 171 by random projection to generate a corresponding random projection value 173 (i.e., 173-1, 173-2, 173-3, . . . ) of the file 171 (see arrow 152). More particularly, the features of a file 171 may be represented by its random projection value 173. In the example of FIG. 1, the features of a file 171-1 are represented by its random projection value 173-1, the features of a file 171-2 are represented by its random projection value 173-2, the features of a file 171-3 are represented by its random projection value 173-3, etc.

In the example of FIG. 1, the training module 174 employs the random projection values 173 (see arrow 153) as a training data set to train and generate one or more anomaly detection models 175 (see arrow 154). More particularly, the training module 174 trains an anomaly detection model 175 with the random projection values 173. An anomaly detection model 175 is configured to detect features that are novel relative to the features of the training data set. That is, an anomaly detection model 175 is trained to look for anomalous features, instead of normal features, of a file.

In one embodiment, the training module 174 uses a Local Outlier Factor (LOF) algorithm to generate a first anomaly detection model 175 and an Isolation Forest algorithm to generate a second anomaly detection model 175.

Generally speaking, a Local Outlier Factor algorithm provides a measure that indicates how likely a certain data point is an anomaly, which is also referred to herein as an "outlier". The Local Outlier Factor algorithm looks at N-neighbors of a certain data point to find out its density and compares this density to the density of other data points. If the density of a data point is much lower than the densities of its neighbors, the data point is far from dense areas and is considered as an anomaly. Like the Local Outlier Factor algorithm, the Isolation Forest algorithm identifies anomalies rather than profiling normal data points. The Isolation Forest algorithm isolates observations by randomly selecting a feature and then randomly selecting a split value between the maximum and minimum values of that selected feature.

To generate a Local Outlier Factor model 175, training is performed in accordance with the Local Outlier Factor algorithm using the random projection values 173 as training data. Similarly, to generate an Isolation Forest model 175, training is performed in accordance with the Isolation Forest algorithm using the random projection values 173 as training data. Program code for implementing the Local Outlier Factor Algorithm and the Isolation Forest algorithm may be obtained from the Scikit-Learn (SKLEARN) website or other sources. The training module 174 may also be implemented using other suitable anomaly detection algorithms without detracting from the merits of the present invention.

The anomaly detection models 175 may be employed to inspect a target file for malware or other cyberthreat by scanning the target file for novel features. In one embodiment, target files with features that the anomaly detection models 175 inferred to be novel are declared to be outliers; target files with no novel features are declared to be normal.

In the example of FIG. 1, an endpoint computer 180 may be a desktop, laptop, server, or other computing device. A cybersecurity module 181 may comprise cybersecurity software that is running on the endpoint computer 180. The cybersecurity module 181 may be configured to perform file inspection in conjunction with the cybersecurity server 170. The cybersecurity module 181 may be configured to detect reception of a file 190 in the endpoint computer 180 and, in response, send out a query (see arrow 155) to the cybersecurity server 170. The file 190 may be an executable file.

In the example of FIG. 1, the query from the endpoint computer 180 includes the file 190. In the cybersecurity server 170, the feature extractor 172 receives the file 190 (see arrow 156) and generates a random projection value 191 (see arrow 157) of the file 190 in the same manner as explained above with reference to the files 171. As can be appreciated, the functionality of the feature extractor 172 may be incorporated in the cybersecurity module 181. In that example, the cybersecurity module 181 generates the random projection value 191, which is included in the query instead of the file 190.

The random projection value 191 is input to one or more anomaly detection models 175, which generate an inference (see arrow 159) that indicates whether or not the random projection value 191 is novel. That is, the inference indicates whether or not the file 190 has novel features relative to the features of the files 171 that were used as training data to generate the anomaly detection models 175. The file 190 may be declared to be normal when the inference does not indicate the presence of novel features in the file 190. Otherwise, when the inference indicates presence of novel features in the file 190, the file 190 may be declared to be an outlier.

An outlier file may be deemed to be a malicious file. For example, in response to a target file being declared to be an outlier, a response action may be performed against the target file, including putting the target file in quarantine, deleting the target file, blocking network traffic that includes the target file, alerting an administrator, and/or other actions to prevent the target file from being executed in a computer or employed by users.

Figure 2:
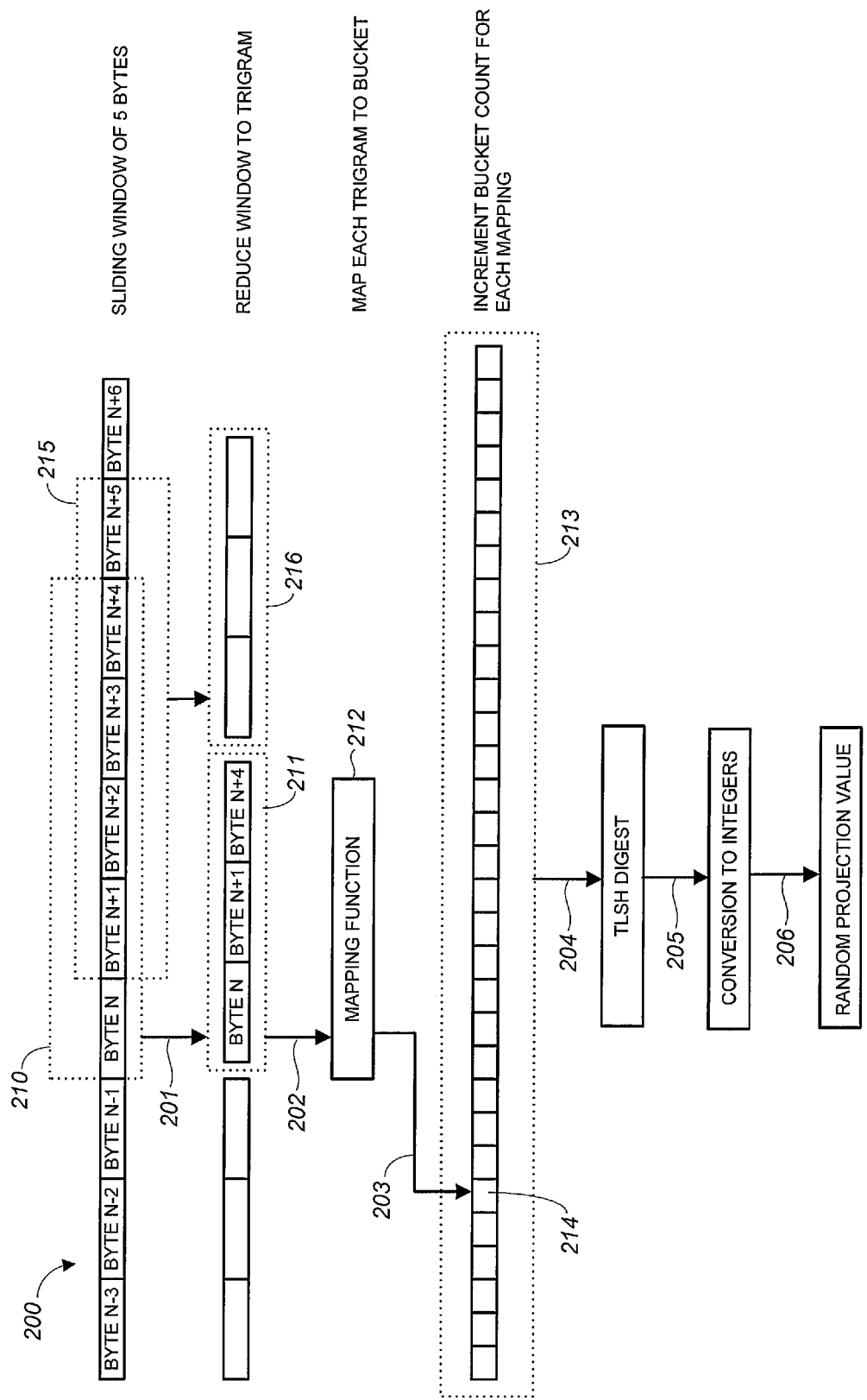
FIG. 2 shows a flow diagram of a computer-implemented method of generating a random projection value in accordance with an embodiment of the present invention.

FIG. 2 shows a flow diagram of a computer-implemented method of generating a random projection value in accordance with an embodiment of the present invention.

Generally speaking, random projections project a higher dimensional data onto a lower dimensional subspace by mapping a series of sliding n-bytes, using a mapping function, to a fixed-length array. In the example of FIG. 2, a file 200 has a plurality of blocks of data, with each block being a byte of data. More particularly, the file 200 has a byte N, byte N−1, byte N+1, etc. The blocks to be processed are enclosed within a sliding window, which is moved to the right one block at a time. In the example of FIG. 2, the sliding window encloses five blocks at a time for processing. This is illustrated by a window 210, which encloses byte N, byte N+1, byte N+2, byte N+3, and byte N+4 for processing. A window 215 represents the window 210 moved to the right to enclose byte N+1, byte N+2, byte N+3, byte N+4, and byte N+5 for processing, and so on.

The blocks enclosed by the sliding window are reduced to a smaller number of blocks. In the example of FIG. 2, the five blocks within a sliding window are reduced to a trigram, i.e., three blocks, using predetermined selection criteria. In one embodiment, blocks that will be duplicates in a subsequent iteration when the window is moved are not selected to be part of the trigram. The blocks that are not selected are discarded from further processing. In the example of FIG. 2, the five bytes enclosed by the window 210 are reduced to a trigram 211 (see arrow 201) consisting of byte N, byte N+1, and byte N+4.

A mapping function 212 maps a trigram to a fixed-length array 213. The mapping function 212 may be implemented using a Pearson Hash function, for example. The array 213 has a plurality of cells, which are referred to as "buckets." In the example of FIG. 2, the mapping function 212 maps the trigram 211 (see arrow 202) to a corresponding bucket 214 (see arrow 203) of the array 213. The count of a bucket is incremented whenever a trigram is mapped onto the bucket. The array 213 is essentially a histogram of features of the file 200.

In one embodiment, the process involving use of a sliding window, reduction to trigram, and mapping to buckets of a fixed-length array, as illustrated by arrows 201-203, are implemented using the Trend Micro Locality Sensitive Hash (TLSH) algorithm. The TLSH algorithm may perform additional processing to format the value of the array 213 into a TLSH digest (see arrow 204). Open source program code for implementing the TLSH algorithm to generate a digest are generally available over the Internet. Other suitable algorithms that perform random projections may also be employed without detracting from the merits of the present invention.

The resulting value of the array 213 may be further processed to allow for use with an anomaly detection algorithm. In one embodiment where a TLSH digest of the file 200 is calculated, the characters of the TLSH digest are converted to integers. More particularly, non-integer characters of the TLSH digest are converted to integers (see arrow 205). For example, assuming the TLSH algorithm calculates the digest for the file 200 as the following 70-character value:

71B012073745A27013678079276E04C59C2021F5E04508EA56EC513617D94 33C675D35 the characters "7", "1", "0", etc. are used as-is, but the characters "B", "A", etc. are translated to corresponding integer values, such that the digest consists of 70 integers. The integer value of the digest is used as the random projection value of the file 200 (see arrow 206).

Figure 3:
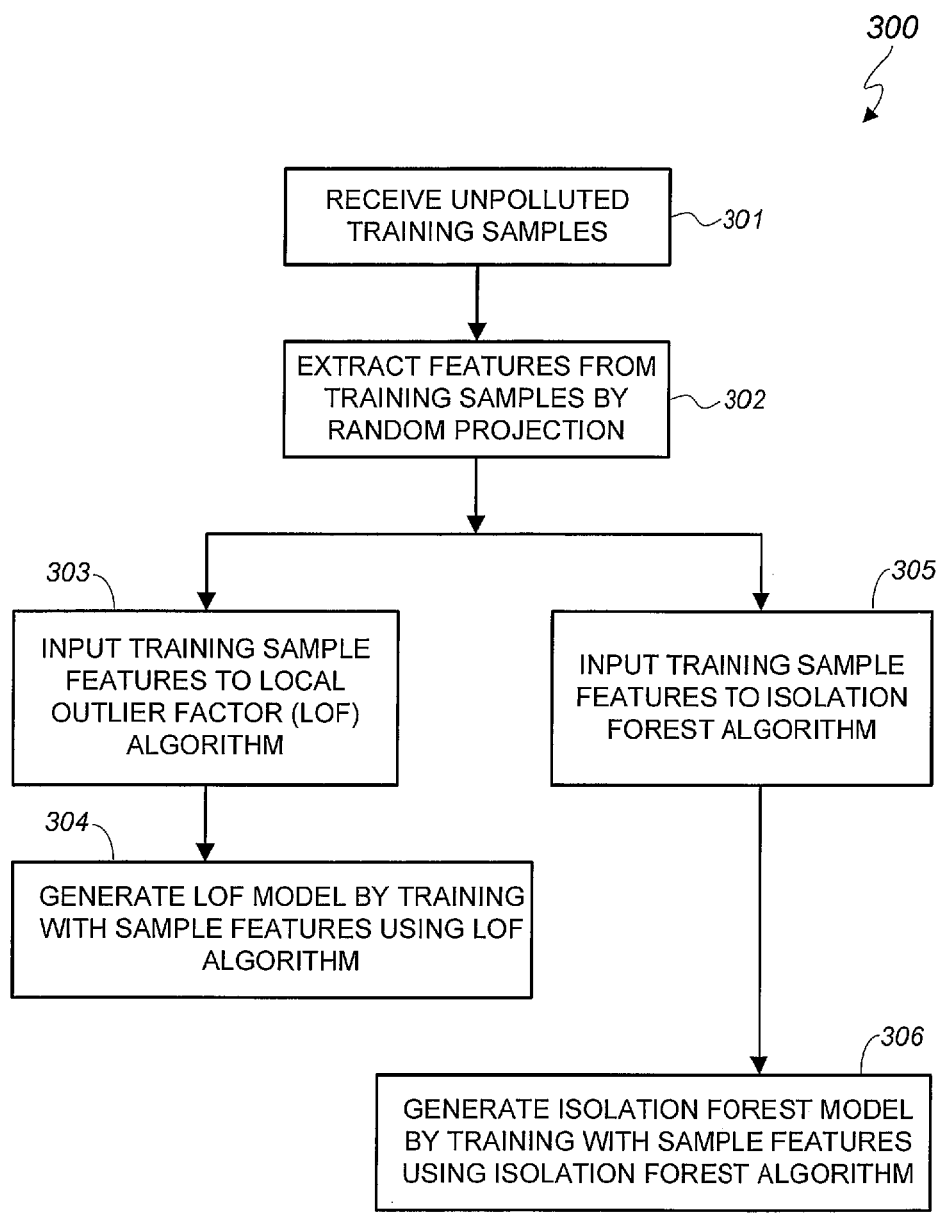
FIG. 3 shows a flow diagram of a computer-implemented method of generating anomaly detection models in accordance with an embodiment of the present invention.

FIG. 3 shows a flow diagram of a computer-implemented method 300 of generating anomaly detection models 175 in accordance with an embodiment of the present invention. The method 300 is explained using the components of the novelty detection system 176 (see FIG. 1).

In the example of FIG. 3, the feature extractor 172 receives unpolluted training samples comprising a plurality of files 171 (step 301). The feature extractor 172 extracts features of the files 171 by random projection (step 302). The extracted features, which comprise random projection values in this example, are used as training data of a Local Outlier Factor algorithm (step 303) to generate a Local Outlier Factor model (step 304). The extracted features are also used as training data to train an Isolation Forest algorithm (step 305) to generate an Isolation Forest model (step 306).

Figure 4:
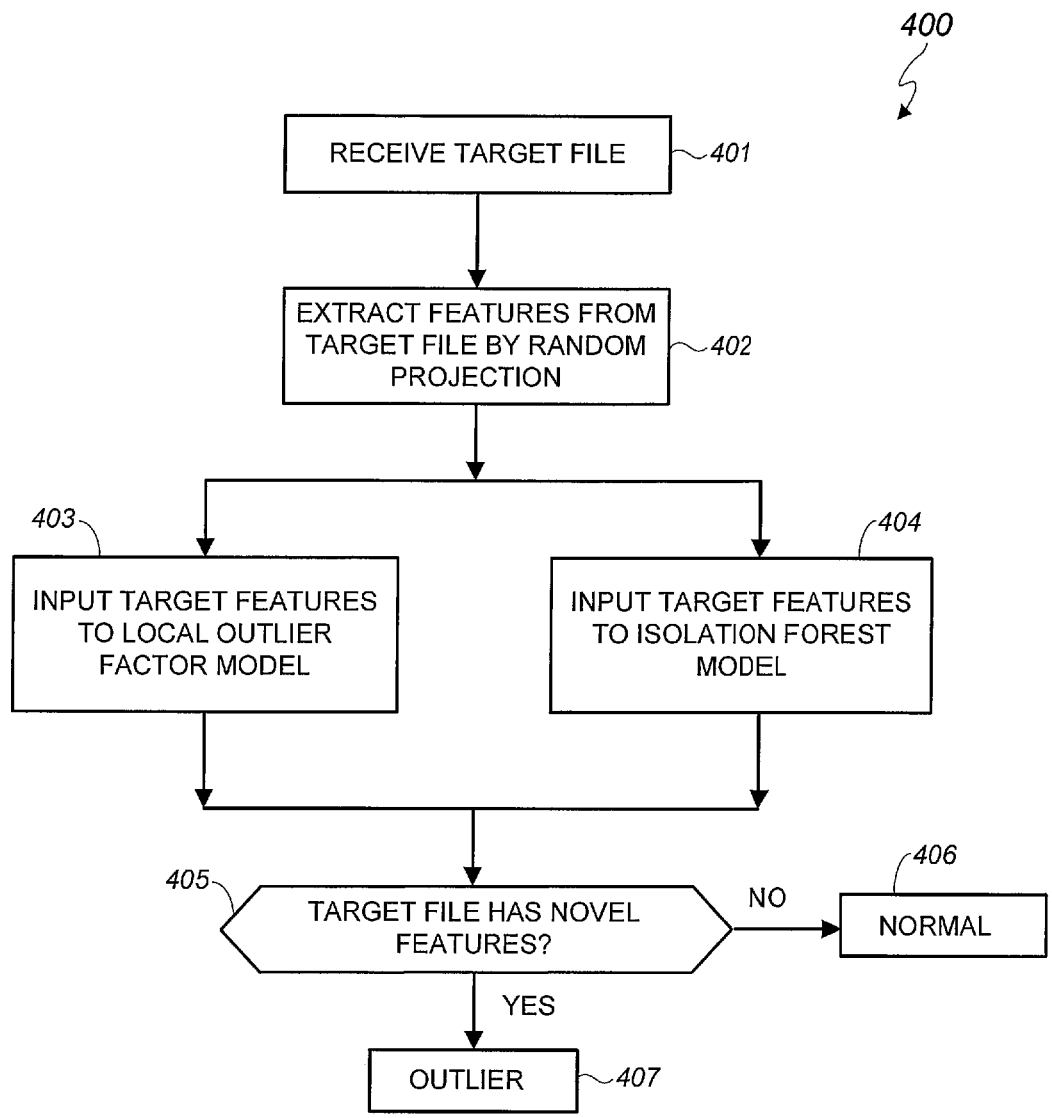
FIG. 4 shows a flow diagram of a computer-implemented method of inspecting a target file in accordance with an embodiment of the present invention.

FIG. 4 shows a flow diagram of a computer-implemented method 400 of inspecting a target file in accordance with an embodiment of the present invention. The method 400 is explained using the components of the novelty detection system 176 (see FIG. 1).

In the example of FIG. 4, a target file is received by the feature extractor 172 (step 401). The feature extractor 172 extracts features of the target file by random projection (step 402). The extracted features of the target file, which is a random projection value in this example, are input to a Local Outlier Factor model 175 (step 403) and to an Isolation Forest model 175 (step 404). The target file is declared to have novel features when the Local Outlier Factor model 175, the Isolation Forest model 175, or both models 175 infer that the target file has novel features. In that case, the target file is declared as an outlier (step 405 to step 407). An outlier file may be deemed to be malicious.

Otherwise, when the Local Outlier Factor model 175 and the Isolation Forest model 175 do not detect novel features in the target file, the target file is deemed to be normal (step 405 to step 406).

In one experiment, the unpolluted training samples consist of 20,000 known normal files. The features of the training samples were extracted by calculating the TLSH digests of the training samples and thereafter converting the TLSH digests to integers as previously described. The integers were used to train and generate a Local Outlier Factor model and an Isolation Forest model using program code that were obtained from the Scikit-Learn (SKLEARN) website.

The testing samples consist of 502 false alarm files from AV-Comparatives benchmark testing. As its name indicates, a false alarm file is a normal file that has been erroneously declared as malicious. To emphasize novelty detection, and to keep the training samples unpolluted, the training samples do not include any of the testing samples.

The testing samples were tested against the anomaly detection models. Among the 502 false alarm files, the Local Outlier Factor model detected 374 to be normal and 128 to be outliers, whereas the Isolation Forest model detected 410 to be normal and 92 to be outliers. These results indicate that the Local Outlier Factor model and the Isolation Forest model are able to correctly infer a significant number of the false alarm files to be normal.

To test for efficacy in detecting outliers, 25000 malicious file samples were randomly selected and tested against the anomaly detection models. Among the 25000 malicious file samples, the Local Outlier Factor model detected 4194 to be normal and 20806 to be outliers, whereas the Isolation Forest model detected 1874 to be normal and 23126 to be outliers. These results indicate that both anomaly detection models are able to detect a significant number of the malicious samples as outliers.

The results of the experiment may be further improved by training with more samples. Furthermore, the novelty detection embodiments described herein may be employed to augment other cybersecurity models. For example, the novelty detection embodiments may be applied as a second file inspection step for verification.

Figure 5:
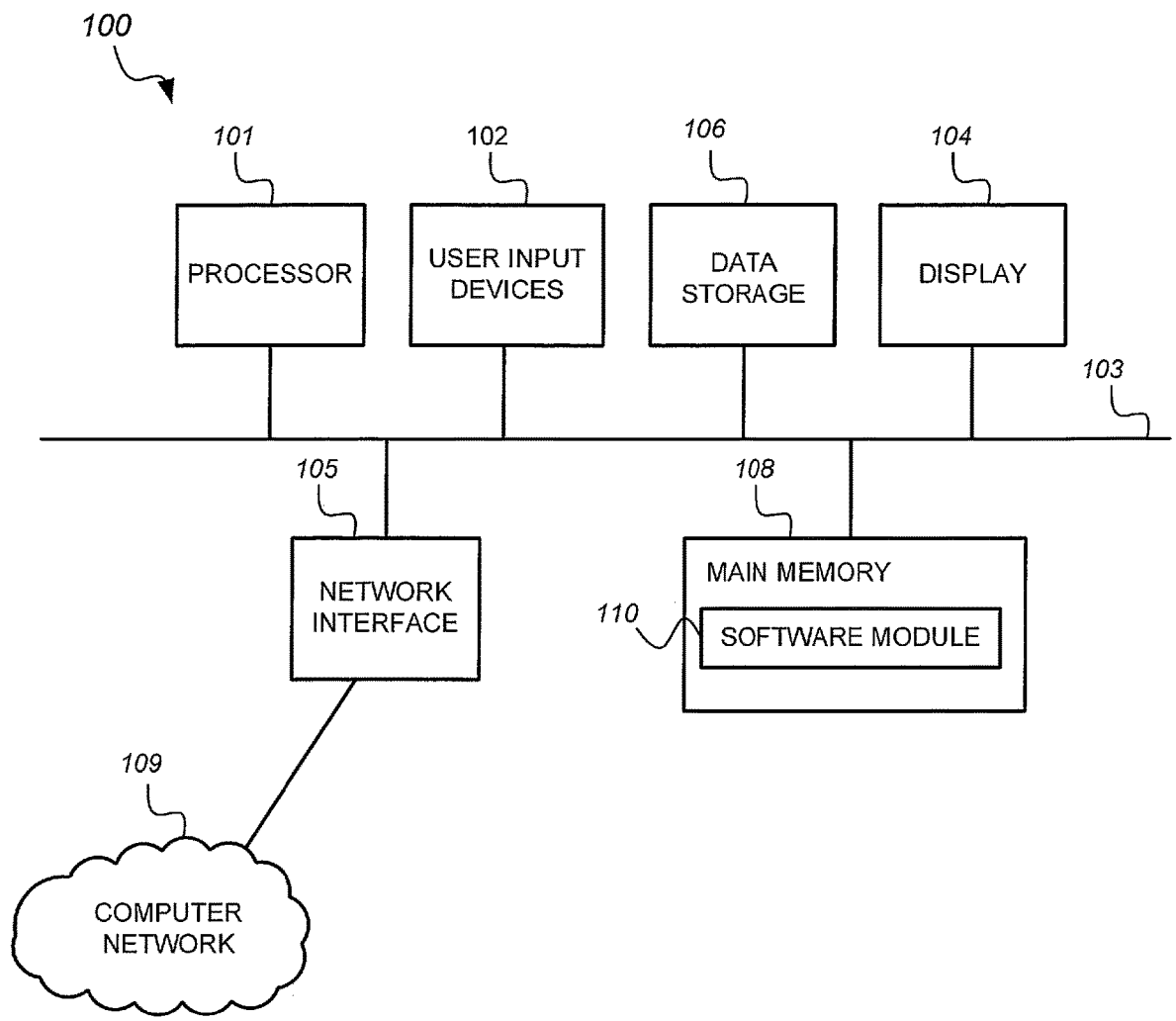
FIG. 5 shows a logical diagram of a computer system that may be employed with embodiments of the present invention.

Referring now to FIG. 5, there is shown a logical diagram of a computer system 100 that may be employed with embodiments of the present invention. The computer system 100 may be employed as a cybersecurity server or other computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display screen 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

In one embodiment where the computer system 100 is configured as a cybersecurity server, the software modules 110 comprise a feature extractor, a training module, and one or more anomaly detection models.

Systems and methods for inspecting files have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:
1. A computer-implemented method of inspecting files, the method comprising:
receiving training samples that comprise sample files that are known to be normal;
extracting features of the sample files by calculating a random projection value of each of the sample files;
generating a first anomaly detection model by training using the features of the sample files;
receiving a first target file to be inspected;
extracting features of the first target file by calculating a random projection value of the first target file;
generating a first inference, using the first anomaly detection model, that indicates whether or not the features of the first target file are novel relative to the features of the sample files; and declaring the first target file to be malicious in response to at least the first inference indicating that the features of the first target file are novel relative to the features of the sample files.

2. The method of claim 1, wherein generating the first anomaly detection model includes training the first anomaly detection model in accordance with a Local Outlier Factor algorithm.

3. The method of claim 1, wherein generating the first anomaly detection model includes training the first anomaly detection model in accordance with an Isolation Forest algorithm.

4. The method of claim 1, further comprising:
receiving a second target file to be inspected;
extracting features of the second target file by calculating a random projection value of the second target file;
generating a second inference, using the first anomaly detection model, that indicates whether or not the features of the second target file are novel relative to the features of the sample files; and
declaring the second target file to be normal in response to the second inference indicating that the features of the second target file are not novel relative to the features of the sample files.

5. The method of claim 1, further comprising:
generating a second anomaly detection model by training using the features of the sample files;
receiving a second target file to be inspected;
extracting features of the second target file by calculating a random projection value of the second target file;
generating a second inference, using the first anomaly detection model, that indicates whether or not the features of the second target file are novel relative to the features of the sample files; and
generating a third inference, using the second anomaly detection model, that indicates whether or not the features of the second target file are novel relative to the features of the sample files.

6. The method of claim 5, further comprising:
declaring the second target file to be malicious in response to the second inference or the third inference indicating that the features of the second target file are novel relative to the features of the sample files.

7. The method of claim 5, wherein the first anomaly detection model is generated using a Local Outlier Factor algorithm and the second anomaly detection model is generated using an Isolation Forest algorithm.

8. A system comprising:
a first computer comprising a processor and memory, the memory storing instructions that when executed by the processor cause the first computer to:
receive training samples that comprise sample files that are known to be normal;
extract features of the sample files by calculating a random projection value of each of the sample files;
generate a first anomaly detection model by training using the features of the sample files;
receive a first target file to be inspected;
extract features of the first target file by calculating a random projection value of the first target file;
generate a first inference, using the first anomaly detection model, that indicates whether or not the features of the first target file are novel relative to the features of the sample files; and
declare the first target file to be malicious in response to at least the first inference indicating that the features of the first target file are novel relative to the features of the sample files.

9. The system of claim 8, further comprising:
a second computer that is configured to send the first target file to the first computer over the Internet.

10. The system of claim 9, wherein the instructions stored in the memory, when executed by the processor, further cause the first computer to communicate the first inference to the second computer.

11. The system of claim 8, wherein the instructions stored in the memory, when executed by the processor, further cause the first computer to:
generate a second anomaly detection model by training using the features of the sample files;
receive a second target file to be inspected;
extract features of the second target file by calculating a random projection value of the second target file;
generate a second inference, using the first anomaly detection model, that indicates whether or not the features of the second target file are novel relative to the features of the sample files; and
generate a third inference, using the second anomaly detection model, that indicates whether or not the features of the second target file are novel relative to the features of the sample files.

12. The system of claim 11, wherein the instructions stored in the memory, when executed by the processor, further cause the first computer to:
declare the second target file to be malicious in response to the second inference or the third inference indicating that the features of the second target file are novel relative to the features of the sample files.

13. A computer-implemented method of inspecting files, the method comprising:
generating a random projection value of each of a plurality of sample files that are known to be normal;
generating, using a first anomaly detection algorithm, a first anomaly detection model using the generated random projection values of the sample files as training data;
receiving a first target file to be inspected;
generating a random projection value of the first target file;
inputting the random projection value of the first target file to the first anomaly detection model to generate a first inference; and
declaring the first target file to be an outlier when the first inference indicates that the target file has a feature that is novel relative to the sample files.

14. The method of claim 13, further comprising:
declaring the first target file to be normal when the inference indicates that the target file has no feature that is novel relative to the sample files.

15. The method of claim 13, wherein the first anomaly detection algorithm is a Local Outlier Factor algorithm.

16. The method of claim 13, wherein the first anomaly detection algorithm is an Isolation Forest algorithm.

17. The method of claim 13, further comprising:
generating, using a second anomaly detection algorithm, a second anomaly detection model using the generated random projection values of the sample files as training data;
receiving a second target file to be inspected;
generating a random projection value of the second target file;

inputting the random projection value of the second target file to the second anomaly detection model to generate a second inference; and declaring the target file to be an outlier when the second inference indicates that the second target file has a feature that is novel relative to the sample files.

18. The method of claim 17, wherein the first anomaly detection algorithm is a Local Outlier Factor algorithm and the second anomaly detection algorithm is an Isolation Forest algorithm.

19. The method of claim 13, wherein generating the random projection value of each of the plurality of sample files that are known to be normal comprises:

calculating a locality-sensitive digest of each of the plurality of sample files; and converting the digest to an integer.

20. The method of claim 19, wherein the locality-sensitive digest is calculated using a TLSH algorithm.

\* \* \* \* \*